(12) United States Patent
Kretzschmar et al.

(10) Patent No.: US 8,449,811 B2
(45) Date of Patent: May 28, 2013

(54) CALCINATED OR SINTERED HOLLOW BODY COMPRISING A SPHERICALLY CURVED SURFACE

(75) Inventors: Ralf Kretzschmar, Dresden (DE); Wolfgang Hungerbach, Müllheim (DE); Gert Bingel, Dresden (DE)

(73) Assignee: Glatt Systemtechnik GmbH, Dresden (DE)

( * ) Notice: Subject to any disclaimer, the term of this patent is extended or adjusted under 35 U.S.C. 154(b) by 1209 days.

(21) Appl. No.: 12/064,209

(22) PCT Filed: Aug. 17, 2006

(86) PCT No.: PCT/DE2006/001483
§ 371 (c)(1),
(2), (4) Date: Jul. 29, 2008

(87) PCT Pub. No.: WO2007/019846
PCT Pub. Date: Feb. 22, 2007

(65) Prior Publication Data
US 2008/0299336 A1   Dec. 4, 2008

(30) Foreign Application Priority Data
Aug. 19, 2005  (DE) .......................... 10 2005 040 599

(51) Int. Cl.
*B28B 1/30* (2006.01)

(52) U.S. Cl.
USPC ........................................................ 264/603

(58) Field of Classification Search
USPC ........................................................ 264/603
See application file for complete search history.

(56) References Cited

U.S. PATENT DOCUMENTS

| | | | |
|---|---|---|---|
| 4,671,909 A | 6/1987 | Torobin | |
| 4,775,598 A | 10/1988 | Jaeckel | |
| 4,917,857 A | 4/1990 | Jaeckel et al. | |
| 5,212,143 A | 5/1993 | Torobin | |
| 5,993,716 A * | 11/1999 | Draenert | .................. 264/221 |
| 2003/0153981 A1 | 8/2003 | Wang et al. | |

FOREIGN PATENT DOCUMENTS

| | | |
|---|---|---|
| AT | 006 556 U1 | 12/2003 |
| DE | 44 03 509 | 8/1995 |
| DE | 199 29 760 | 1/2001 |
| DE | 199 33 450 | 1/2001 |
| DE | 102 58 773 | 7/2004 |
| EP | 0 300 543 | 1/1989 |
| EP | 0 811 359 | 12/1997 |
| WO | 92/06653 | 4/1992 |
| WO | 00/42991 | 7/2000 |
| WO | 02/40837 | 5/2002 |

* cited by examiner

*Primary Examiner* — Joseph S Del Sole
*Assistant Examiner* — Russell Kemmerle, III
(74) *Attorney, Agent, or Firm* — Fay Kaplun & Marcin, LLP

(57) ABSTRACT

A method is for producing calcinated or sintered hollow bodies comprising a spherical surface, to hollow bodies produced using the method, and to the uses thereof. Calcinated or sintered hollow bodies comprising a spherically curved surface, an enlarged, freely accessible surface and/or a structured surface. An organic spherical carrier is coated with a powder which forms the shell of a hollow body, and a binding agent, both contained in suspension. A heat treatment is then carried out, leading to the expulsion of organic constituents and to the sin-tering process. At least one elevation is arranged on the surface of the carrier or embodied thereon, the projection past the surface corresponding at least to the thickness of the shell of the finished sintered hollow body, taking into account the degree of shrinkage of the powder material during the sintering process. The elevation(s) is/are then removed by conversion into the gas phase of the respective material from which they are formed and/or mechanically, during the heat treatment.

7 Claims, No Drawings

CALCINATED OR SINTERED HOLLOW BODY COMPRISING A SPHERICALLY CURVED SURFACE

FIELD OF INVENTION

The invention relates to calcinated or sintered hollow bodes comprising a spherical surface, to methods for the manufacture of such hollow bodies and to their uses. The hollow bodies in accordance with the invention can have shells of practically all possible materials which can be sintered. The shells can therefore be formed of metals, metal alloys or also ceramics.

BACKGROUND INFORMATION

Such hollow bodies are known per se and can be made and also manufactured as is described inter alia in EP 1 251 985 A1.

In this connection, such spherical hollow bodies have advantageous properties such as high mechanical strength, with a simultaneously reduced mass. Their outer surface is in particular likewise relatively large due to the spherical shape and even if the shell has a certain porosity, the outer surfaces are relatively planar and smooth, with a corresponding surface roughness.

However, these parameters are not sufficient for a number of applications.

SUMMARY OF INVENTION

The present invention relates to calcinated or sintered hollow bodies with a spherically curved surface which have an enlarged freely accessible surface and/or a structured surface.

DETAILED DESCRIPTION

At least one opening is present at hollow bodies in accordance with the invention, in particular for the enlargement of the surface freely accessible for fluids, said opening being guided through the total thickness of the shell of hollow bodies so that fluids can also impinge on the inner surface of shells of hollow bodies in accordance with the invention. In this connection, the otherwise already advantageous properties, in particular their mechanical strength, are only reduced negligibly.

The number and the free cross-sections of such openings can be directly influenced, which will be looked at later.

It is favorable to provide more than one opening at a hollow body in accordance with the invention to achieve a simplified fluid exchange or also pressure equalization between the environment and the interior of the hollow bodies.

However, this can also be achieved in that the shell material of the hollow bodies has a porosity of at least 90%. In this connection, the proportion of one or more openings in the total porosity should remain out of consideration. An optionally high porosity should also not be comparable with the openings required in accordance with the invention.

Depending on the desired application, there is a possibility to arrange the openings distributed stochastically or regularly over the surface and/or the periphery of hollow bodies.

In addition, the size and the geometric designs of the free cross-sections of openings can be influenced and adapted to the respective application.

Free cross-sections can thus be made in gap form, in circular form, in circular annular form, in rectangular to square form, in hexagonal, octagonal form or also in the form of other polygons. In this connection, different geometries of free cross-sections of the openings can also be present at a hollow body.

It can be advantageous for specific applications for at least two openings to be arranged and formed diametrically opposite at a hollow body.

The outer diameters and the thickness of the shells of hollow bodies can be selected and influenced such as is also the case with the known hollow bodies with a closed shell.

The hollow bodies in accordance with the invention are manufactured with some modifications such as is also already known from the prior art. A spherical carrier made from an organic material is thus coated with a suspension which is formed by a binding agent and a calcinable or sinterable powder. The layer thickness on the surface and the powder then influence the thickness of the shell, the external diameter and the porosity and surface roughness of the fully sintered hollow body. In this connection, the external diameter of the carrier naturally also has an influence on the external diameter.

The powder material per se and the sinter activity of the powder used are likewise parameters for the influencing of the properties of a hollow body.

Elevated portions on the carriers or only or additionally placeholders can be embedded into the coating on the surface of the organic carrier for the formation of openings on hollow bodies in accordance with the invention. Such placeholders can already be included in the suspension with which the surface of an organic carrier, for example a carrier made of polystyrene, is coated.

Elevated portions can be formed directly on the surface of organic carriers. This can be achieved, for example, by a direct shaping of carriers. With carriers made of a plastic, this can be done in a manner known per se e.g. by injection molding. If carriers made of polystyrene are used, they can also be foamed beforehand or subsequently in correspondingly structured molds.

However, there is also the possibility of arranging and fixing elevated portions subsequently on the surface of such carriers. A thin binding agent film can thus, for example, be applied to the surface of organic carriers. Particles or other elements forming elevated portions can then be fixed thereon using this binding agent before the suspension with the powder forming the shell after the sintering is applied. Such elements forming elevated portions can then be carried out in a stochastically distributed, locally defined manner at specific desired positions of the surface of a carrier but also, for example, by dipping into or sprinkling with particles.

Elevated portions can, however, also be formed by elements which are inserted, for example, into the surface of an organic carrier (e.g. a polystyrene carrier).

The parts, elements or also particles forming the elevated portions as well as the placeholders can be formed from one material or material mixture which can, similar to the organic carrier, be pyrolized during the heat treatment, that is, can be converted into the gas phase, with this taking place below the respective sintering temperature.

However, materials or material mixtures can also be used which change specific properties during the heat treatment. This can, for example, be the reduction of the strength. In this connection, the one or more opening(s) can be removed mechanically after the sintering without the hollow body being destroyed or damaged.

If the material or the material mixture has a thermal coefficient of expansion suitable for the shell material of the respective hollow body, this can simply fall out of the shell during cooling and the respective opening is then exposed.

The elevated portions or placeholders should be appropriately dimensioned in this connection to allow the openings to be formed. Elevated portions should thus have a vertical projection on the surface and placeholders should have volumes which corresponds at least to the thickness of the shell of the fully calcinated or sintered hollow body, that is, the respective degree of shrinkage can be taken into account during sintering.

Placeholders can also have a different design in addition to different dimensioning adapted to the respective application. Fibrous placeholders can thus be used, for example, for gap-shaped openings. However, particles in a suitable grain size can also be used as placeholders.

The hollow bodies in accordance with the invention with a spherically curved surface can be used for the manufacture of different end products, but also for different applications per se; in the last named case, for example, as such hollow bodies in bulk.

They can thus be used as catalyst carriers in catalysts. Filters or mufflers can also be manufactured from or with the hollow bodies in accordance with the invention. A plurality of hollow bodies can be connected to one another in this connection, preferably in a firmly bonded manner, with then at least not all openings on hollow bodies having to be closed.

The pressure loss and the flow resistance on the flow through a bed or structure of the hollow bodies by liquids or gases can be reduced using the hollow bodies in accordance with the invention. This is in particular advantageous in the throughflow of exhaust gases from internal combustion engines, since the back pressure of the exhaust gas can be correspondingly reduced, which has a favorable effect on the performance and on the efficiency of the internal combustion engine.

On a use as or for a catalyst/catalysts, the enlarged freely accessible surface has a favorable effect externally and internally so that the catalytic effect can be improved.

If mufflers are manufactured using hollow bodies in accordance with the invention, a use of hollow bodies of different design (number and size of openings, porosity) and/or of hollow bodies of different dimensioning as well as a use with conventional hollow bodies, which then have a completely closed shell, can contribute to an improved muffling.

If hollow bodies in accordance with the invention are used in chemical processes, the reactivity, the absorption capability, a catalytic effect or also the separation capability can be improved. In this connection a suitable porosity of the shells is also advantageous. The material use can be reduced and the corresponding plant equipment can be made with smaller dimensions.

Hollow bodies in accordance with the invention can, however, also be used for the manufacture of implants for humans and animals. In these cases, tissue can grow into the implant structure formed from or with hollow bodies in accordance with the invention as well as into the free openings in a considerably better manner such that an improved, more solid connection of such an implant to bone can be achieved. As already mentioned, the strength is only slightly reduced by the openings present in accordance with the invention. If, however, such implants are manufactured as bone replacement, these implants can be manufactured both with hollow bodies in accordance with the invention, which are then preferably arranged outside, and optionally in the inner core, as well as together with conventional hollow bodies having closed shells. A shape stability and strength of an implant can thereby be achieved which can also resist high strains.

An adaptation to different local demands is also possible, in particular by a direct influencing of the modulus of elasticity to implants.

It can moreover be stated that a reduction in mass is possible using hollow bodies in accordance with the invention. They can also be electrically conductive, magnetizable and pneumatically transportable.

The invention claimed is:

1. A method for manufacture of a calcinated or sintered hollow body, comprising:
   coating an organic spherical carrier with a powder, which forms a shell of the hollow body, and a binding agent, the hollow body having a spherically curved surface;
   performing one of the following two steps: (A) forming or arranging at least one elevated portion on a surface of the carrier; and (B) embedding at least one placeholder into the shell, a vertical projection of the at least one elevated portion or the at least one placeholder corresponds to at least a thickness of the shell of the fully sintered hollow body while taking account of a degree of shrinkage of the powder during sintering; and
   heat treating the carrier to remove organic components and sinter,
   wherein at least one of the at least one elevated portion and the at least one placeholder is removed by at least one of (a) the heat treatment by conversion into a gas phase of the respective material from which they are made and (b) mechanical removal.

2. The method in accordance with claim 1, wherein when the at least one placeholder is embedded, the at least one placeholder includes one of a placeholder in a particle form and a fibrous placeholder.

3. The method in accordance with claim 1, wherein when the at least one elevated portion is formed, the carrier is coated with a surface structure having elevated portions.

4. The method in accordance with claim 1, wherein when the at least one placeholder is embedded, the at least one placeholder includes at least one of placeholders having different volumes and placeholders having different geometrical design.

5. The method in accordance with claim 1, wherein when the at least one elevated portion is formed, the carrier is coated with at least one of differently dimensioned and designed elevated portions.

6. The method in accordance with claim 1, wherein when the at least one placeholder is embedded, the at least one placeholder is made of one of an organic material and material mixture.

7. The method in accordance with claim 1, wherein the at least one elevated portion is formed or arranged at predetermined positions on the surface of the carrier.

* * * * *